Dec. 30, 1952 — T. W. GRIFFIN — 2,623,330
GLASS FEEDER SPOUT HEATING STRUCTURE
Filed Oct. 20, 1949 — 2 SHEETS—SHEET 1

INVENTOR
THOMAS W. GRIFFIN
BY Parham + Bates
ATTORNEYS

Dec. 30, 1952     T. W. GRIFFIN     2,623,330

GLASS FEEDER SPOUT HEATING STRUCTURE

Filed Oct. 20, 1949     2 SHEETS—SHEET 2

INVENTOR
THOMAS W. GRIFFIN
BY Parham + Bates
ATTORNEYS

Patented Dec. 30, 1952

2,623,330

UNITED STATES PATENT OFFICE 2,623,330

GLASS FEEDER SPOUT HEATING STRUCTURE

Thomas W. Griffin, Weatogue, Conn., assignor to Emhart Manufacturing Company, a corporation of Delaware Application October 20, 1949, Serial No. 122,367

7 Claims. (Cl. 49—55)

This invention relates generally to improvements in molten glass feeders and more particularly to improvements in the means for heating the molten glass in a feeder spout having a glass discharge outlet in its bottom.

A feeder spout structure to which the improvements of the present invention are applicable is illustrated in U. S. Patent No. 2,139,911 granted December 13, 1938. That spout is generally U-shaped in horizontal sectional configuration and has an arcuately curved front wall. The spout rests in a suitable casing which is spaced therefrom at suitable places at which insulation is provided between the spout and the casing. A combustion wall is mounted upon the glass retaining wall of the spout and conforms to its horizontal sectional configuration. The combustion wall comprises suitably formed and positioned burner blocks provided with spaced burner ports and burners are mounted to fire into or through the burner ports to effect heating of the glass in the spout. A fuel supply manifold fits closely against the front and side portions of the spout wall and is operatively connected with the individual burners.

In feeders having a spout structure substantially as above described and as shown in the aforesaid U. S. Patent No. 2,139,911, the burner ports in the curved portion of the combustion wall are formed in the refractory burner blocks to direct combustion products from the burners generally toward the vertical center line or axis of curvature of the front portion of the spout, this vertical center line or axis of curvature being approximately the same as the vertical axis of a glass discharge outlet in the bottom of the spout and the firing thus being toward refractory glass discharge control implements which depend into the glass in a spout in axial alignment with the outlet. Such discharge implements as shown in the aforesaid U. S. Patent No. 2,139,911 and as widely used comprise a vertically reciprocable refractory plunger and a vertical refractory tube surrounding the plunger and having its lower end depending in the glass to a predetermined level in relation to the upper end of the glass discharge outlet.

In glassware manufacturing installations including a feeder having a spout of the type described, it sometimes is necessary or desirable to locate an associate glassware forming machine close to the front end of the feeder so that the provision of burners at that place would interfere with proper location of a structural part of the forming machine. Lack of such burners leaves a greater area than usual of the glass surface in the front portion of the spout without direct heating and in consequence glass in the spout next to the front wall thereof may become unduly cold and viscous or stagnant. This condition is undesirable and may result in slow devitrification of such stagnant and relatively cold glass, particularly if the glass to be fed is of one of certain compositions, as a boro-silicate glass, in which devitrification takes place more readily than in ordinary bottle glass.

An object of the present invention is to improve the heating provisions for a spout of the type described so as to insure direct heating of the glass in the front portion of the spout as well as in the remainder thereof without the necessity of locating burners directly at the front of the spout, whereby associate forming machine or other structural parts may be positioned close to the front of the feeder if desired without interfering with efficient heating of the glass in the spout.

A further object of the invention is the provision in improved spout heating means of novel burner blocks for the curved front portion of the spout.

Other objects and advantages of the invention hereinafter will be pointed out or will become obvious from the following description of a practical embodiment of the invention as shown in the accompanying drawings, in which Fig. 1 is a plan view of a glass feeder spout equipped with improved heating means of the present invention and with suitable glass discharge control means and certain other customary structural adjuncts;

Figure 2:
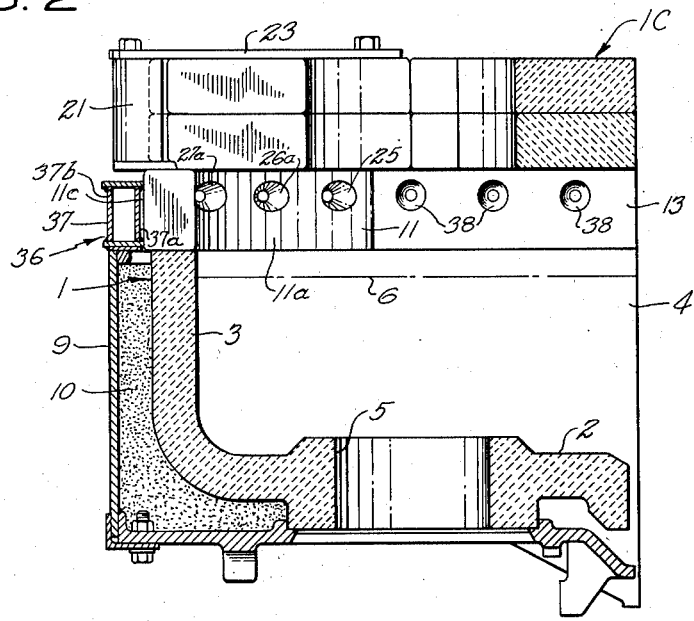
Fig. 2 is a longitudinal vertical section through the structure shown in Fig. 1 along the line 2—2, with the glass discharge control means omitted.

In the example shown, a feeder spout, generally designated 1, Fig. 2, comprises a bottom 2, an arcuately curved front wall 3 and spaced parallel side wall portions, one of which is shown and designated 4. These may all be formed integrally or in one piece of suitable refractory material as is customary. A glass discharge outlet 5 is formed in the bottom 2 of the spout at the approximate vertical center line of the spout and thus is spaced approximately the same distance from the front and side wall portions of the spout although such spacing is not essential and the distance from the vertical center line of the outlet to different portions of the spout wall may be different. In any event, the spout includes a space of substantial horizontal extent in front of the bottom outlet which in the use of the spout is filled with molten glass when the spout contains glass to a predetermined level, as to the level indicated at 6 in Fig. 2.

For controlling feed of glass through the outlet 5, suitable control means may be used. Such control means in the example shown is represented by the vertical plunger 7 and the vertical tube 8 which surrounds the plunger, both being in axial alignment with the discharge outlet.

Figure 3:
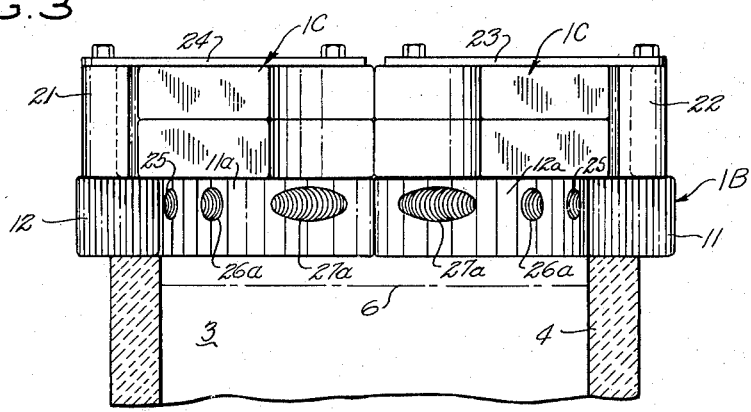
Fig. 3 is a partial transverse vertical section through the spout and its combustion wall and cover, substantially along the line 3—3 of Fig. 1, with the glass discharge regulating means omitted.
Figure 5:
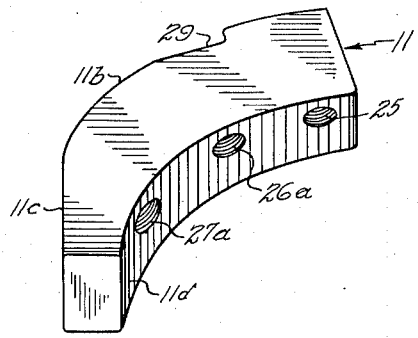
Fig. 5 is a perspective view of one of these front spout burner blocks.

The spout is provided with a suitable casing 9 and with heat insulation which may be granular as indicated at 10 and confined between the casing and the spout. Resting on the spout wall and conforming to the curvature thereof is a combustion wall 1-B, comprising front left-hand and right-hand burner blocks 11 and 12, respectively, Figs. 1, 2 and 3, and left-hand and right-hand spout side wall burner blocks 13 and 14, respectively, Fig. 1, the hand of these blocks being determined by their relative locations as viewed from the front of the spout. The front burner blocks are of special form and have special arrangements of burner ports therein according to the present invention as hereinafter will be more particularly described.

The combustion wall 1-B may be covered by a spout cover 1-C comprising component blocks of suitable material or materials, sizes and shapes. The spout cover per se does not form part of the present invention and the construction, and other details thereof may vary according to individual preference or need.

Figure 1:
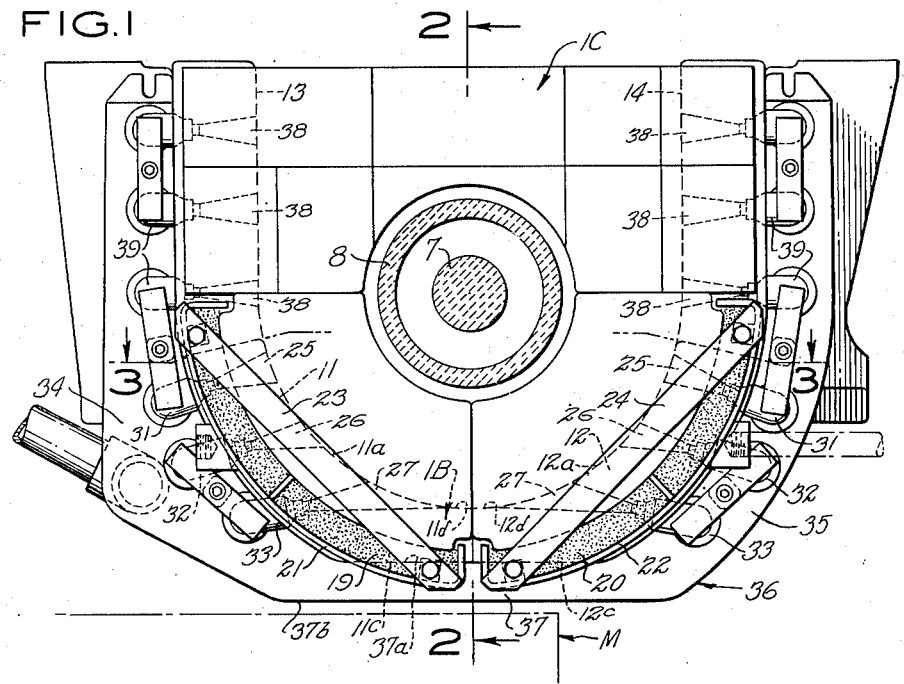

As shown in Fig. 1, granular insulation may be provided as indicated at 19 and 20 between the front edge of the spout cover and left-hand and right-hand insulation retaining casing sections 21 and 22, respectively. These casing sections may be retained removably in desired positions by suitable means, as by the straps 23 and 24 which partially overlie and rest upon portions of the spout cover.

The front burner blocks 11 and 12 may be identical with each other except for the difference in hand. Each is formed with an arcuate inner wall 11a or 12a conforming in curvature to the inner wall of the underlying portion of the supporting spout wall. The outer wall of each front burner block likewise may be arcuate and parallel with its inner wall from the rearward end of the block for the greater part of its length as indicated at 11b or 12b. At the extreme front of the spout, the blocks 11 and 12 may be flattened at their exteriors as indicated at 11c and 12c, respectively, so as to reduce their radial extent or width without altering their internal shape. The outer surface portions 11c and 12c of the blocks thus are vertical and lie in a plane approximately perpendicular to the longitudinal axis of the spout as best seen in Fig. 1 when the blocks are operatively positioned on the curved front portion 3 of the spout wall with their inner faces substantially flush with those of the underlying portions of the spout wall as shown for the left-hand block 11 in Fig. 2.

Each front block 11 or 12 is provided with a plurality of spaced burner ports. In the example shown, these are three in number and respectively are indicated at 25, 26 and 27 in each block. The ports 25 are in the more rearward portions of the blocks and may be formed to extend transversely through the blocks in a generally radial direction between the inner and outer surfaces thereof. This locates the ports 25 so that they point toward the vertical axial line of the spout outlet 5 and hence toward the tube 8 which extends above the glass in the spout and is concentric with the outlet when the blocks 11 and 12 are operatively positioned on the spout wall, as shown in Fig. 1. The ports 26 are located at a short distance from the rearward ports 25. They extend obliquely through the blocks so that they are turned forwardly to a predetermined angular extent from the radial. Their inner ends, indicated at 26a, are laterally widened or enlarged toward their front ends and hence the front of the spout.

Figure 4:
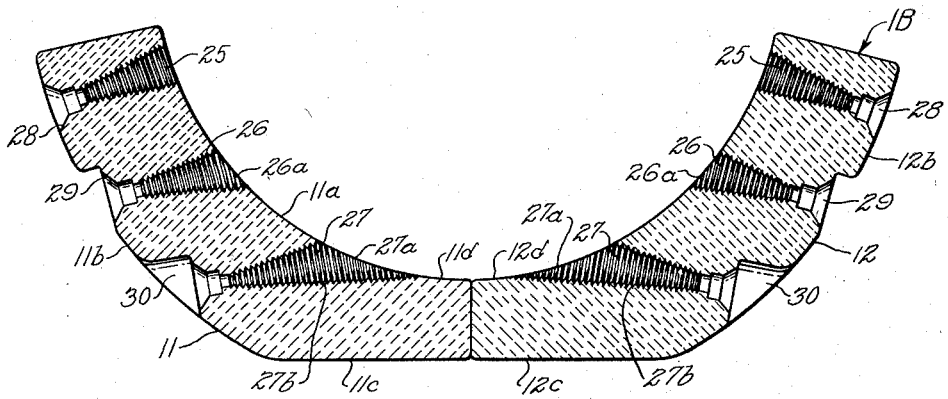
Fig. 4 is a horizontal section through the respective right and left hand front spout burner blocks alone, the section being at the level of the burner ports formed therein.

The ports 27 also are oblique and are turned further from the radial toward the front than the ports 26. The inner ends, indicated at 27a, of the ports 27 are widened or laterally enlarged at their front sides to a substantially greater extent than the inner ends 26a of the ports 26. As shown in Figs. 1 and 4, the front side walls, indicated at 27b, of the ports 27, are nearly in line with each other and with the intervening inner faces 11d and 12d of the abutting end portions of the blocks 11 and 12, respectively, when these blocks are disposed in working relation to each other, as shown to advantage in Fig. 1. Products of combustion from the opposed burner ports 27 thus will scrub against the intervening inner face portions of these blocks at the front of the spout.

Suitable indentations or recesses may be provided, as at 28, 29, and 30, in the blocks 11 and 12 to accommodate burners 31, 32 and 33, respectively. These may be carried by and operatively connected with the left-hand and right-hand side portions 34 and 35, respectively, of a fuel supply manifold, generally indicated at 36, Figs. 1 and 2. The manifold 36 is generally of U-shape as viewed in plan and its intermediate portion, indicated at 37, may be formed to be relatively narrow where it extends transversely across the front of the combustion wall 1-B as best seen in Fig. 1. The manifold 36 may be supported on the casing 9 of the feeder spout in any suitable manner. It conforms at its interior to the contour of the exterior of the enclosed combustion wall for the spout and is of suitable dimensions to fit closely thereagainst. The inner surface of the front portion 37 of this manifold may be flattened, as indicated at 37a, to lie flatly against the similarly shaped outer surfaces 11c of the abutting end portions of the burner blocks 11 and 12. The outer surface of the front portion 37 of the manifold 36 may be similarly flattened as indicated at 37b, Fig. 1, so as to afford clearance for associate structure, generally indicated M, at the front of the spout. The arrangement is such that the outer surface of the front portion 37 of the manifold 36 may be flush with or need not project beyond the front portion of the casing 9. See Fig. 2. Consequently, it permits close positioning of structural parts, as a part of an associate glassware forming machine, M, Fig. 1. The front portion 37 of the manifold need not supply fuel directly to any burner in the construction shown but provides fuel flow communication between the burner carrying side portions of the manifold. Obviously, this function may be dispensed with and the portion 37 of the manifold made even narrower than shown or even dispensed with by obvious changes of the manifold 36 if more space should be needed at the front of the combustion wall.

The spout side burner blocks 13 and 14, which supplement the front burner blocks 11 and 12, may be provided with spaced burner ports, indicated at 38. These ports may extend transversely through the spout side burner blocks so that burners, indicated at 39, associated therewith may fire in directions transverse of the spout. The burners 39 are carried by the side portions 34 and 35 of the manifold 36.

The fuel supplied by the manifold 36 may be a suitable mixture of combustible gas and air or any other suitable fuel may be used. Preferably, the fuel and fuel supply provisions are such as to provide a heating action of the type disclosed in the aforesaid patent, No. 2,139,911. The relative locations and contours of the inner ends of the burner ports in the front blocks 11 and 12 assure direct heating of the glass in the front of the spout within the confines of these front burner blocks and heating of the blocks themselves so as to radiate heat onto the glass. Similarly, the ports in the spout side burner blocks are sufficiently numerous and spaced close enough together so as to assure direct heating of the intervening portion of the glass in the spout and heating of the walls of the burner blocks at the inner ends of such ports. It thus is less important for satisfactory control of the temperature and viscosity of the glass in the spout that the tube 8 be rotated about its axis for its glass circulating and blending effect. The invention permits positioning of structure close to the front of the feeder spout, as may be necessary for coordinated operation of the feeder and associate forming machine, without impairment of the provisions for heating the glass in the feeder spout.

Various changes in and modifications of the illustrative structure shown in the drawings and herein particularly described will now be obvious to those skilled in the art and I therefore do not wish to be limited to the details of this illustrative structure.

I claim:

1. Heating means for a glass feeder spout having a bottom provided with a glass discharge outlet therein and a glass retaining wall having an arcuately curved portion extending partially around and spaced from said outlet, comprising a combustion wall having an arcuately curved portion adapted to be positioned on the arcuate portion of the retaining wall and corresponding generally therewith in shape and arcuate extent, said arcuately curved portion of the combustion wall being formed with a pair of opposed burner ports respectively extending therethrough from the outer surface to the inner surface of said combustion wall at opposite sides of its middle portion and in directions sufficiently oblique from the radial and toward said middle portion to direct products of combustion from the inner ends of said ports across the intervening space between them close to the inner surface of the middle portion of said combustion wall.

2. Heating means for a glass feeder spout, said spout comprising a bottom having a glass discharge outlet and an upturned glass retaining wall comprising an arcuately curved front portion and a pair of side portions and being open at its rear for flow of glass thereinto between the side portions to and forwardly of said outlet in the bottom to said arcuately curved front portion of the retaining wall, said outlet being spaced a substantial distance from said arcuately curved front portion of the retaining wall and also a substantial distance from each of the side portions of said wall, said heating means comprising a combustion wall comprising a pair of respectively right and left hand arcuately curved front burner blocks adapted to be mounted on and to extend substantially the full length of the arcuately curved portion of the retaining wall, the adjacent, relatively more forward ends of said blocks abutting each other at the center line of said curved portion of the retaining wall, said blocks being formed with their abutting end portions free from burner ports and with spaced lateral burner ports in the relatively more rearward remaining portions thereof, the most forwardly located of said ports being turned in directions oblique to the radial and toward the front of the space within the combustion wall sufficiently to direct products of combustion therefrom close to the inner faces of the abutting, forward end portions of the blocks.

3. Heating means as defined by claim 2 wherein the ports in said blocks in addition to said most forwardly located ones are turned in directions of less forward inclination from the radial than the most forwardly located ports and so that the degree of said forward inclination is less the more rearward the location of the ports in said blocks.

4. Heating means as defined by claim 2 wherein the abutting end portions of said blocks are relatively reduced in thickness and flattened at their exteriors to afford clearance for a closely positioned associate structural element.

5. Heating means as defined by claim 4 and, in addition, a fuel supply manifold fitting closely against the sides and front of said combustion wall, the front portion of said manifold having a relatively flattened shape to fit against the flattened external surfaces of the abutting end portions of said burner blocks, and burners operatively connected to said manifold and disposed in operative relation to the several burner ports.

6. For heating means for a feeder spout having an arcuately curved glass retaining wall, a combustion wall comprising a pair of respectively right and left hand arcuate refractory burner blocks adapted to rest upon and extend for substantially the full extent of said wall when said blocks are disposed thereon with their adjacent ends abutting each other at the transverse center line of the arcuately curved glass retaining wall, said blocks having a plurality of spaced burner ports formed therein so that the ports nearest the abutting ends extend obliquely through said blocks from their outer to their inner faces and in directions having a relatively great lateral inclination toward said abutting ends and the remaining ports have less inclination toward said abutting ends.

7. A combustion wall as defined by claim 6 wherein said arcuate blocks have their abutting end portions flattened or beveled at their outer faces to reduce the thickness of these portions of the blocks without altering the shape of their inner faces.

THOMAS W. GRIFFIN.

REFERENCES CITED

The following references are of record in the file of this patent:

UNITED STATES PATENTS

| Number | Name | Date |
| --- | --- | --- |
| 1,269,132 | Tierney | June 11, 1918 |
| 1,637,473 | Culbertson | Aug. 2, 1927 |
| 1,777,411 | Mayr | Oct. 7, 1930 |
| 1,829,320 | White | Oct. 27, 1931 |
| 1,977,968 | McBurney | Oct. 23, 1934 |
| 2,080,625 | Miller | May 18, 1937 |
| 2,118,502 | French et al. | May 24, 1938 |
| 2,139,770 | Peiler et al. | Dec. 13, 1938 |
| 2,139,911 | Peiler et al. | Dec. 13, 1938 |
| 2,230,960 | Levy | Feb. 4, 1941 |